United States Patent
Liu et al.

(10) Patent No.: US 11,578,250 B1
(45) Date of Patent: Feb. 14, 2023

(54) CEMENTITIOUS PLUGGING WALL SOLIDIFER FOR WATER-BASED DRILLING FLUID, AND A PREPARATION METHOD THEREOF AND A WATER-BASED DRILLING FLUID

(71) Applicant: China University of Petroleum (East China), Qingdao (CN)

(72) Inventors: Jingping Liu, Qingdao (CN); Jinsheng Sun, Qingdao (CN); Kaihe Lv, Qingdao (CN); Jintang Wang, Qingdao (CN); Jiafeng Jin, Qingdao (CN); Yingrui Bai, Qingdao (CN); Xianbin Huang, Qingdao (CN); Jian Li, Qingdao (CN); Shenglong Shi, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 17/749,822

(22) Filed: May 20, 2022

(30) Foreign Application Priority Data

Apr. 14, 2022 (CN) .......................... 202210391878.7

(51) Int. Cl.
*E21B 43/26* (2006.01)
*C09K 8/467* (2006.01)
*C09K 109/00* (2006.01)

(52) U.S. Cl.
CPC .......... *C09K 8/467* (2013.01); *C09K 2109/00* (2013.01)

(58) Field of Classification Search
CPC ...... C09K 8/467; C09K 2109/00; E21B 43/26
USPC ........................................... 166/293
See application file for complete search history.

(56) References Cited

U.S. PATENT DOCUMENTS

| | | | |
|---|---|---|---|
| 9,199,879 B2 * | 12/2015 | Thaemlitz | C09K 8/487 |
| 10,954,427 B2 * | 3/2021 | Kalgaonkar | C09K 8/487 |
| 11,149,180 B2 * | 10/2021 | Zhang | C09K 8/572 |
| 2013/0292120 A1 * | 11/2013 | Patil | C09K 8/506 |
| | | | 166/293 |
| 2016/0251571 A1 * | 9/2016 | Agrawal | A61K 8/8152 |
| | | | 507/219 |

FOREIGN PATENT DOCUMENTS

| | | |
|---|---|---|
| CN | 104177517 A | 12/2014 |
| CN | 106634878 A | 5/2017 |
| CN | 107502322 A | 12/2017 |
| CN | 108456286 A | 8/2018 |
| CN | 109679598 A | 4/2019 |

* cited by examiner

*Primary Examiner* — William D Hutton, Jr.
*Assistant Examiner* — Ashish K Varma
(74) *Attorney, Agent, or Firm* — Calfee Halter & Griswold LLP

(57) ABSTRACT

The present disclosure to a cementitious plugging wall solidifier for water-based drilling fluid and a preparation method thereof and a water-based drilling fluid.

10 Claims, 1 Drawing Sheet

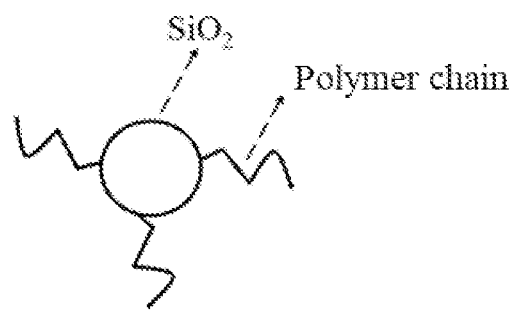

CEMENTITIOUS PLUGGING WALL SOLIDIFER FOR WATER-BASED DRILLING FLUID, AND A PREPARATION METHOD THEREOF AND A WATER-BASED DRILLING FLUID

CROSS REFERENCE TO RELATED APPLICATIONS

The application claims priority to Chinese Application No. 202210391878.7, filed on Apr. 14, 2022, entitled "a cementitious plugging wall solidifier for water-based drilling fluid, and a preparation method and a use thereof", which is herein specifically and entirely incorporated by reference.

FIELD

The present disclosure relates to the technical field of well drilling, in particular to a cementitious plugging wall solidifier for water-based drilling fluid, and a preparation method and a use thereof.

BACKGROUND

Fractured formation has developed micro-fractures and cracks. Water-based drilling fluids tend to penetrate deep into the formation along the fractures during the drilling process, and give rise to serious events such as borehole wall collapse, sticking of a drilling tool, thereby cause long drilling cycles and high well drilling and well completion costs. The existing treatment techniques mainly reside in an addition of a plugging agent to plug the pores and cracks of the fractured formation. The asphalt-based plugging agents require that their softening point match the formation temperature, and its plugging strength is insufficient; the calcium carbonate-based plugging agents have high plug strength, but their shape and size are difficult to precisely match the pores and cracks of formation, thus cannot effectively play a plugging role; the polymer microsphere-based plugging agents have the ability to effectively match the shape and size of formation fractures, but their plug strength is not high.

The chemically cementitious wall solidifiers have been gradually emerged as the research hotspots for stabilizing borehole wall of the fractured formation in recent years; both the carboxymethyl chitosan having dopamine-derived groups grafted to the main chain (CN104177517A, CN106634878A) and the polymer having dopamine-derived groups grafted to the main chain (CN109679598A, CN 108456286A) are capable of cementing pores and cracks of formation, but have insufficient temperature resistance and plugging strength; the epoxy resin-based plugging agents (CN107502322A) are capable of effectively cementing pores and cracks of formation, but have poor compatibility with the drilling fluids.

In view of the foregoing content, the present disclosure has prepared a cementitious plugging wall solidifier for water-based drilling fluid having desired temperature resistance and combined effects of rigid physical plugging and chemical cementing, which has significant theoretical and practical importance in maintaining stability of the borehole wall of the fractured formation.

SUMMARY

In order to overcome the problems of the existing art, the present disclosure provides a cementitious plugging wall solidifier for water-based drilling fluid, and a preparation method and a use thereof. The wall solidifier of the present disclosure is particularly suitable for stabilizing the borehole wall of a fractured formation, can effectively cementing and plugging pores and cracks of the fractured formation, and inhibit hydration and dispersion of shale and reduce filtrate loss of the drilling fluids, thus the wall solidifier is conducive to maintaining or even enhancing rock strength, thereby playing a role of stabilizing a borehole wall of the fractured formation.

In order to achieve the above objects, a first aspect of the present disclosure provides a method for preparing a cementitious plugging wall solidifier for water-based drilling fluid comprising:

(1) preparation of modified silica: dispersing nano-silica in an anhydrous ethanol to obtain a dispersion system A, dispersing γ-(methacryloxy)propyltrimethoxysilane in water/anhydrous ethanol system to obtain a dispersion system B, blending the dispersion system A and the dispersion system B and adjusting the pH to a range of 8-9, then adding phenothiazine to carry out a reaction, filtering a product after completion of the reaction, and washing and drying the product to obtain a modified silica;

(2) mixing the modified silica produced in step (1), acrylamide, acrylic acid, sodium p-styrene sulfonate, dimethyldiallylammonium chloride, 1-ethyl-(3-dimethylaminopropyl)carbodiimide, dopamine hydrochloride and water, introducing a protective gas under the stirring and heating conditions to remove oxygen, adding an initiator to carry out a reaction;

(3) after the reaction is finished, subjecting a product obtained in step (2) to washing, drying and pulverizing to prepare a cementitious plugging wall solidifier.

Preferably, the weight ratio of the nano-silica, the γ-(methacryloyloxy)propyltrimethoxysilane and the phenothiazine in step (1) is (70-80):(7-8):1.

Preferably, the water/anhydrous ethanol dispersion system in step (1) is prepared by mixing water and anhydrous ethanol according to a volume fraction of 1:(8.5-9.5).

Preferably, triethylamine is used for adjusting the pH in step (1).

Preferably, the reaction conditions in step (1) comprise: a temperature within a range of 55-65° C., and a time of 3-5 hours.

Preferably, the weight ratio of the modified silica, the acrylamide, the acrylic acid, the sodium p-styrene sulfonate, the dimethyldiallyl ammonium chloride, the 1-ethyl-(3-dimethylaminopropyl)carbodiimide, the dopamine hydrochloride and the initiator is (2-5):(10-20):(2-5):(1-2):(2-5):(0.2-0.5):(2-5):(0.2-0.5).

Preferably, the initiator in step (2) is at least one selected from the group consisting of azobisisobutyramidine hydrochloride, potassium persulfate and ammonium persulfate.

Preferably, the conditions of removing oxygen in step (2) comprise: a temperature of 60-70° C. and a time of 25-40 min.

Preferably, the reaction conditions in step (2) comprise: a temperature of 60-70° C. and a time of 4-5 hours.

A second aspect of the present disclosure provides a cementitious plugging wall solidifier prepared with the aforesaid method.

A third aspect of the present disclosure provides a method for preparing a water-based drilling fluid comprising: adding bentonite, polyacrylamide potassium salt, polyanionic cellulose, sulfonated lignite resin, the aforesaid cementitious plugging wall solidifier, sulfonated asphalt, methyl oleate and polymeric alcohol into water under the stirring conditions.

Preferably, the method comprises the specific processes as follows: adding bentonite into water and stirring for 22-30 hours under stirring conditions; then adding polyacrylamide potassium salt and polyanionic cellulose and stirring for 25-40 min; subsequently adding sulfonated lignite resin and stirring for 18-25 min, adding the cementitious plugging wall solidifier and stirring for 18-25 min, then adding sulfonated asphalt and methyl oleate and stirring for 18-25 min, subsequently adding polymeric alcohol and stirring for 18-25 min.

Preferably, the weight ratio of the bentonite, the polyacrylamide potassium salt, the polyanionic cellulose, the sulfonated lignite resin, the cementitious plugging wall solidifier, the sulfonated asphalt, the methyl oleate and the polymeric alcohol is 4:(0.1-0.2):(0.3-0.5):(2-3):(0.5-2):(2-3):(2-3):(2-4).

A fourth aspect of the present disclosure provides a use of the cementitious plugging wall solidifier prepared with the aforesaid method or the water-based drilling fluid prepared with the aforesaid method in stabilizing a borehole wall of the fractured formation.

As compared with the existing art, the present disclosure has the following advantages:

(1) The present disclosure produces a modified silica having a specific double bond structure by using a specific method, and uses the modified silica as a feedstock ingredient to react with other specific organic component to produce a cementitious plugging wall solidifier having a specific structure, the cementitious plugging wall solidifier comprises both a polymer part and a modified silica part, wherein the polymer segmer is linked to the modified silica part, the schematic diagram is as shown in FIG. 1.

(2) The modified silica part in the cementitious plugging wall solidifier primarily provides excellent plugging property, while the polymer part mainly provides strong cementitious function, and the modified silica part enhances the temperature resistance of the polymer part.

(3) The cementitious plugging wall solidifier provided by the present disclosure can be used alone in water; the cementitious plugging wall solidifier has desirable compatibility with drilling fluids, and can also be applied in the water-based drilling fluids.

(4) The present disclosure provides a cementitious plugging wall solidifier, which in a first aspect, is capable of effectively adhering to the pores and cracks in the borehole wall, bridging, plugging and cementing and curing the formation apertures through the rigid silica part; in a second aspect, the wall solidifier is cemented and cured on the borehole wall surface, and can effectively inhibit hydration and dispersion of shale; in a third aspect, the wall solidifier can be cemented and cured during a process of forming mud cake through filtrate loss of the drilling fluid, increase compactness of the mud cake and effectively reduce filtrate loss of the drilling fluid, thereby facilitate maintaining or even enhancing rock strength, and play a role of stabilizing a borehole wall of the fractured formation.

(5) The water-based drilling fluid prepared according to the method of the present disclosure with a cementitious plugging wall solidifier provided by the present disclosure can significantly increase the shale recovery rate, suppress the hydration and dispersion of borehole wall shale of the fractured formation, and can effectively maintain the compressive strength of shale, further prevent the borehole wall collapse and sticking of drilling tool, thereby strengthening the borehole wall of fractured formation and reducing the down-hole troublesome conditions, playing a role of stabilizing a borehole wall of the fractured formation. The water-based drilling fluid provided by the present disclosure is conducive to maintaining or even enhancing rock strength, thereby playing a role of stabilizing a borehole wall of the fractured formation.

BRIEF DESCRIPTION OF THE DRAWINGS

FIG. 1 is a structural schematic view of a cementitious plugging wall solidifier prepared by the present disclosure.

DETAILED DESCRIPTION

The present disclosure describes the specific embodiments in detail below with reference to the appended FIGURE. It shall be understood that the specific embodiments described herein is only used for illustrating and explaining the present disclosure, instead of imposing a limitation thereto.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a method for preparing a cementitious plugging wall solidifier for water-based drilling fluid comprising:

(1) preparation of modified silica: dispersing nano silica in an anhydrous ethanol to obtain a dispersion system A, dispersing γ-(methacryloxy)propyltrimethoxysilane (KH570) in water/anhydrous ethanol system to obtain a dispersion system B, blending the dispersion system A and the dispersion system B and adjusting the pH to a range of 8-9, then adding phenothiazine to carry out a reaction, filtering a product after completion of the reaction, and washing and drying the product to obtain a modified silica;

(2) mixing the modified silica produced in step (1), acrylamide, acrylic acid, sodium p-styrene sulfonate, dimethyldiallylammonium chloride, 1-ethyl-(3-dimethylaminopropyl)carbodiimide, dopamine hydrochloride and water, introducing a protective gas under the stirring and heating conditions to remove oxygen, adding an initiator to carry out a reaction;

(3) after the reaction is finished, subjecting a product obtained in step (2) to washing, drying and pulverizing to prepare a cementitious plugging wall solidifier.

In the method of the present disclosure, the modified silica prepared according to the method of step (1) has a double bond structure, and can carry out a polymerization reaction with other monomers to form a silica grafted to a polymer long chain, and the modified silica has excellent plugging properties, and the modified silica is capable of enhancing the temperature resistance of the polymer part.

In the cementitious plugging wall solidifier prepared with the method of the present disclosure, the rigid modified silica part provides a plugging property, and enhances the temperature resistance of the polymer part; the acrylamide, the acrylic acid, the sodium p-styrene sulfonate, the dimethyldiallyl ammonium chloride, the dopamine hydrochloride react to form a polymer chain part; the sodium p-styrene sulfonate can enhance temperature resistance of the polymer chain part; the acrylamide forms the backbone structure of the polymer chain part; the acrylic acid and dimethyldiallyl ammonium chloride can enhance adsorption of the polymer chain part to the borehole wall rock; the dopamine hydrochloride provides the polymer chain part with strong cementitious function.

In a specific embodiment, the weight ratio of the nano-silica, the γ-(methacryloyloxy)propyltrimethoxysilane and the phenothiazine in step (1) may be (70-80):(7-8):1, for example, 70:7:1, 70:7.5:1, 70:8:1, 75:7:1, 75:7.5:1, 75:8:1, 80:7:1, 80:7.5:1, or 80:8:1.

In step (1) of the present disclosure, the specific process of preparing the dispersion system A is as follows: adding nano-silica to an anhydrous ethanol, stirring the mixture such that the nanosilica is sufficiently dispersed, wherein a weight ratio of the nanosilica to anhydrous ethanol is (14-16):100.

In step (1) of the present disclosure, the specific process of preparing the dispersion system B is as follows: adding γ-(methacryloyloxy)propyltrimethoxysilane (KH570) to a water/anhydrous ethanol system, stirring the mixture such that the γ-(methacryloyloxy)propyltrimethoxysilane is sufficiently dispersed, wherein a weight ratio of the γ-(methacryloyloxy)propyltrimethoxysilane to the water/anhydrous ethanol dispersion system is (1.4-1.6):100.

In order to provide the dispersion degree of γ-(methacryloyloxy)propyltrimethoxysilane (KH570), in a preferred embodiment, the water/anhydrous ethanol dispersion system in step (1) is prepared by mixing water and anhydrous ethanol according to a volume fraction of 1:(8.5-9.5) (e.g., 1:8.5, 1:9 or 1:9.5).

In the method for preparing a modified silica, it is necessary to control the change scope of pH of the reaction system to be within an appropriate range by adjusting the pH, in order to enable the reaction to proceed more efficiently. In a preferred embodiment, triethylamine is used for adjusting the pH in step (1). The pH of the system has a small change under the adjustment of triethylamine, and the system alkalinity is prone to be excessively large when a modifier (e.g., sodium hydroxide) is used as a conditioning agent.

In step (1), the reaction mode is not limited, it may be a conventional choice in the art. In a preferred embodiment, the reaction is a reflux reaction.

In the present disclosure, in order to produce the modified silica having the desired structure of the present disclosure, it is necessary to perform the reaction within an appropriate range. In a specific embodiment, the reaction temperature in step (1) is within a range of 55-65° C., for example, it may be 55° C., 60° C. or 65° C. In a specific embodiment, the reaction time in step (1) is within a range of 3-5 h, for example, it may be 3 h, 4 h or 5 h.

The specific operations of subjecting the product obtained after completion of reaction to filtering and washing and drying the filtered product in step (1) are as follows: subjecting the product obtained after completion of reaction to filtering so as to obtain a powder product, washing the powder product with ethanol and again filtering the washed powder product, after repeatedly washing for 2-3 times, subjecting the product to drying under vacuum or drying under room temperature, such that the modified silica is produced.

In the present disclosure, the used amounts of each raw material of the cementitious plugging wall solidifier in the present disclosure need to be controlled within an appropriate range, in order to produce a wall solidifier having both excellent plugging property and strong cementitious function. The used amount of water is not particularly defined, as long as the reaction can be performed normally.

In a particular embodiment, the weight ratio of the modified silica, the acrylamide, the acrylic acid, the sodium p-styrene sulfonate, the dimethyldiallyl ammonium chloride, the 1-ethyl-(3-dimethylaminopropyl)carbodiimide, the dopamine hydrochloride and the initiator is (2-5):(10-20):(2-5):(1-2):(2-5):(0.2-0.5):(2-5):(0.2-0.5).

In a preferred embodiment, the weight ratio of the modified silica, the acrylamide, the acrylic acid, the sodium p-styrene sulfonate, the dimethyldiallyl ammonium chloride, the 1-ethyl-(3-dimethylaminopropyl)carbodiimide, the dopamine hydrochloride and the initiator is 2.5:15:3.5:1.5:2.5:0.2:(2-5):0.35.

In the present disclosure, the 1-ethyl-(3-dimethylaminopropyl)carbodiimide is an activator. In the present disclosure, the initiator may be a conventional choice in the art. In a specific embodiment, the initiator in step (2) is at least one selected from the group consisting of azobisisobutyramidine hydrochloride (V50), potassium persulfate and ammonium persulfate. In a preferred embodiment, the initiator is the azobisisobutyramidine hydrochloride.

In the method of preparing a cementitious plugging wall solidifier of the present disclosure, both the removing oxygen and the reaction in step (2) are carried out under heating conditions. In a preferred embodiment, the heating mode may be a conventional choice in the art. In a preferred embodiment, a water bath is used for heating, both the removing oxygen and the reaction are carried out under the same temperature.

In a specific embodiment, the conditions of removing oxygen in step (2) comprise: a temperature of 60-70° C., for example, the temperature may be 60° C., 65° C. or 70° C.; and a time of 25-40 min, such as 25 min, 30 min, 35 min or 40 min.

In a specific embodiment, the reaction conditions in step (2) comprise: a temperature of 60-70° C., for example, the temperature may be 60° C., 65° C. or 70° C.; and a time of 4-5 hours, such as 4 h, 4.5 h or 5 h.

Compared with the existing art, the cementitious plugging wall solidifiers prepared with the methods of the present disclosure has better compatibility with the drilling fluids, it is conducive to maintaining or even enhancing rock strength, thereby playing a role of stabilizing a borehole wall of the fractured formation.

In a second aspect, the present disclosure provides a cementitious plugging wall solidifier prepared with the aforesaid method. The cementitious plugging wall solidifier comprises both a polymer part and a modified silica part, wherein the modified silica part in the cementitious plugging wall solidifier primarily provides excellent plugging property, while the polymer part mainly provides strong cementitious function, and the modified silica part enhances the temperature resistance of the polymer part.

In a third aspect, the present disclosure provides a method for preparing a water-based drilling fluid comprising: adding bentonite, polyacrylamide potassium salt, polyanionic cellulose, sulfonated lignite resin, the cementitious plugging wall solidifier above, sulfonated asphalt, methyl oleate and polymeric alcohol into water under the stirring conditions.

In a specific embodiment, the method comprises the specific processes as follows: adding bentonite into water and stirring for 22-30 hours under stirring conditions; then adding the polyacrylamide potassium salt and the polyanionic cellulose and stirring for 25-40 min; subsequently adding the sulfonated lignite resin and stirring for 18-25 min, adding the cementitious plugging wall solidifier and stirring for 18-25 min, then adding the sulfonated asphalt and the methyl oleate and stirring for 18-25 min, subsequently adding polymeric alcohol and stirring for 18-25 min.

In a specific embodiment, the process of preparing a water-based drilling fluid in the present disclosure may be carried out in a high stirring cup, the whole preparation process is performed with stirring at a low speed. In a preferred embodiment, the stirring rate is within a range of 4,000-6,000 rpm, for example, 4,000 rpm, 5,000 rpm or 6,000 rpm.

In preferred embodiments, the weight ratio of the bentonite, the polyacrylamide potassium salt, the polyanionic cellulose, the sulfonated lignite resin, the cementitious plugging wall solidifier, the sulfonated asphalt, the methyl oleate and the polymeric alcohol is 4:(0.1-0.2):(0.3-0.5):(2-3):(0.5-2):(2-3):(2-3):(2-4). In a more preferred embodiment, the weight ratio of the bentonite, the polyacrylamide potassium salt, the polyanionic cellulose, the sulfonated lignite resin, the cementitious plugging wall solidifier, the sulfonated asphalt, the methyl oleate and polymeric alcohol is 4:0.2:0.5:3:2:3:3:4.

In a specific embodiment, the present disclosure provide a water-based drilling fluid obtained by the above method comprising bentonite, polyacrylamide potassium salt, polyanionic cellulose, sulfonated lignite resin, the cementitious plugging wall solidifier, sulfonated asphalt, methyl oleate and polymeric alcohol. And the weight ratio of the bentonite, the polyacrylamide potassium salt, the polyanionic cellulose, the sulfonated lignite resin, the cementitious plugging wall solidifier, the sulfonated asphalt, the methyl oleate and the polymeric alcohol is 4:(0.1-0.2):(0.3-0.5):(2-3):(0.5-2):(2-3):(2-3):(2-4). In a more preferred embodiment, the weight ratio of the bentonite, the polyacrylamide potassium salt, the polyanionic cellulose, the sulfonated lignite resin, the cementitious plugging wall solidifier, the sulfonated asphalt, the methyl oleate and polymeric alcohol is 4:0.2:0.5:3:2:3:3:4. And the bentonite is contained in an amount of 4 wt %, the polyacrylamide potassium salt is contained in an amount of 0.1-0.2 wt %, the polyanionic cellulose is contained in an amount of 0.3-0.5 wt %, the sulfonated lignite resin is contained in an amount of 2-3 wt %, the cementitious plugging wall solidifier is contained in an amount of 0.5-2 wt %, the sulfonated asphalt is contained in an amount of 2-3 wt %, the methyl oleate is contained in an amount of 2-3 wt %, and the polymeric alcohol is contained in an amount of 2-4 wt %, based on the total weight of the water-based drilling fluid. In the present disclosure, the sum of each component in the water-based drilling fluid is 100%.

In a fourth aspect, the present disclosure provides a use of the cementitious plugging wall solidifier prepared with the aforesaid method or the water-based drilling fluid prepared with the aforesaid method in stabilizing a borehole wall of the fractured formation. The particular applications reside in cementing the borehole wall of fractured formation with the cementitious plugging wall solidifier or the water-based drilling fluid, plugging the pores and cracks of formation, suppressing hydration and dispersion of shale and reducing the filtrate loss, thereby maintaining the rock strength.

The present disclosure described in detail below with reference to examples, but the protection scope of the present disclosure is not limited thereto. Unless otherwise specified, each of the materials used in the following preparation examples, examples and comparative examples is commercially available, and each of the methods in use pertains to the conventional method in the art.

The nano-silica, acrylamide, acrylic acid, sodium p-styrene sulfonate, 1-ethyl-(3-dimethylaminopropyl)carbodiimide, dimethyldiallyl ammonium chloride, γ-(methacryloyloxy)propyltrimethoxysilane (KH570), polyacrylamide potassium salt, polyanionic cellulose, dopamine hydrochloride were supplied by the Shandong Juxin New Material Co., Ltd. The sulfonated lignite resin, sulfonated asphalt, methyl oleate, polymeric alcohol were provided by the China Petroleum Engineering Technology Research Institute Co., Ltd.

The modified silica used in the examples below was prepared according to the following method:

1) 15 g of nano-silica was weighted and added into 100 g of anhydrous ethanol, and subjected to magnetic stirring to sufficiently disperse the nanosilica, so as to obtain a dispersion system A;

2) 1.5 g of γ-(methacryloyloxy)propyltrimethoxysilane (KH570) was weighted and added into 100 g of water/anhydrous ethanol system, and subjected to magnetic stirring to sufficiently disperse the KH570 to obtain a dispersion system B, wherein the water/anhydrous ethanol dispersion system was prepared by uniformly mixing water and anhydrous ethanol according to a volume fraction of 1:9;

3) the dispersion system A and the dispersion system B were poured into a flask, triethylamine was used for adjusting the pH to 8.5, 0.2 parts by weight of phenothiazine was added to carry out a reflux reaction at 60° C. for 4 h;

4) after the reaction was finished, the reaction products were taken and subjected to filtering, the powder products were washed with ethanol and filtered again, and subjected to repeated washing for 2-3 times, the products were subjected to drying under vacuum at room temperature or airing under room temperature, such that the modified silica was prepared.

Examples 1 to 4 served to illustrate a preparation process of the cementitious plugging wall solidifiers A1-A4.

Example 1

2.5 g of the modified silica above, 15 g of acrylamide, 3.5 g of acrylic acid, 1.5 g of sodium p-styrene sulfonate, 2.5 g of dimethyldiallyl ammonium chloride, 0.2 g of 1-ethyl-(3-dimethylaminopropyl)carbodiimide, 5 g of dopamine hydrochloride were respectively added into a flask containing 150 g of water, the materials were stirred until the materials were sufficiently dispersed; the flask was heated to 60° C. by water bath and kept stirring and heating, the process of removing nitrogen gas with nitrogen gas was performed for 30 min; 0.35 g of azobisisobutyramidine hydrochloride (V50) was added into the flask and the reaction was maintained for 4 hours; after the reaction was completed, the viscous product was taken out and washed with acetone for 3 times, and then subjected to drying and pulverizing, such that the cementitious plugging wall solidifier A1 was prepared.

Example 2

2.5 g of the modified silica above, 16 g of acrylamide, 3 g of acrylic acid, 1.8 g of sodium p-styrene sulfonate, 3 g of dimethyldiallyl ammonium chloride, 3 g of 1-ethyl-(3-dimethylaminopropyl)carbodiimide, 3.5 g of dopamine hydrochloride were respectively added into a flask containing 160 g of water, the materials were stirred until the materials were sufficiently dispersed; the flask was heated to 65° C. by water bath and kept stirring and heating, the process of removing nitrogen gas with nitrogen gas was performed for 30 min; 0.3 g of V50 was added into the flask and the reaction was maintained for 5 hours; after the reaction was completed, the viscous product was taken out and washed with acetone for 3 times, and then subjected to drying and pulverizing, such that the cementitious plugging wall solidifier A2 was prepared.

Example 3

2.5 g of the modified silica above, 14 g of acrylamide, 4 g of acrylic acid, 1.3 g of sodium p-styrene sulfonate, 4 g of dimethyldiallyl ammonium chloride, 0.4 g of 1-ethyl-(3-dimethylaminopropyl)carbodiimide, 2 g of dopamine hydrochloride were respectively added into a flask containing 170 g of water, the materials were stirred until said materials were sufficiently dispersed; the flask was heated to 70° C. by water bath and kept stirring and heating, the process of removing nitrogen gas with nitrogen gas was performed for 30 min; 0.4 g of V50 was added into the flask and the reaction was maintained for 4.5 hours; after the reaction was completed, the viscous product was taken out and washed with acetone for 3 times, and then subjected to drying and pulverizing, such that the cementitious plugging wall solidifier A3 was prepared.

Example 4

The cementitious plugging wall solidifier was prepared according to the method of Example 1, except that 0.35 g of the initiator V50 was replaced with 0.35 g of potassium persulfate, such that the cementitious plugging wall solidifier A4 was prepared.

Examples 5-8 served to illustrate the process of preparing the drilling fluids F1-F4.

Example 5

100 g of water was added into a high stirring cup, 4 g of bentonite was added under the stirring conditions containing a rotational speed of 5,000 rpm, and stirred for 24 hours, 0.2 g of polyacrylamide potassium salt and 0.5 g of polyanionic cellulose were then added and stirred for 30 minutes, 3 g of sulfonated lignite resin was further added and stirred for 20 minutes, 2 g of the wall solidifier A1 was added and stirred for 20 minutes, 3 g of sulfonated asphalt and 3 g of methyl oleate were subsequently added and stirred for 20 minutes, 4 g of polymeric alcohol was then added and stirred for 20 minutes, such that the drilling fluid F1 was prepared.

Example 6

110 g of water was added into a high stirring cup, 4 g of bentonite was added under the stirring conditions containing a rotational speed of 5,000 rpm, and stirred for 25 hours, 0.18 g of polyacrylamide potassium salt and 0.5 g of polyanionic cellulose were then added and stirred for 25 minutes, 3 g of sulfonated lignite resin was further added and stirred for 18 minutes, 1.8 g of the wall solidifier A2 was added and stirred for 22 minutes, 3 g of sulfonated asphalt and 2.8 g of methyl oleate were subsequently added and stirred for 25 minutes, 4 g of polymeric alcohol was then added and stirred for 24 minutes, such that the drilling fluid F2 was prepared.

Example 7

105 g of water was added into a high stirring cup, 4 g of bentonite was added under the stirring conditions containing a rotational speed of 5,000 rpm, and stirred for 23 hours, 0.2 g of polyacrylamide potassium salt and 0.45 g of polyanionic cellulose were then added and stirred for 35 minutes, 3 g of sulfonated lignite resin was further added and stirred for 22 minutes, 2 g of the wall solidifier A3 was added and stirred for 18 minutes, 2.8 g of sulfonated asphalt and 3 g of methyl oleate were subsequently added and stirred for 25 minutes, 4 g of polymeric alcohol was then added and stirred for 19 minutes, such that the drilling fluid F3 was prepared.

Example 8

100 g of water was added into a high stirring cup, 4 g of bentonite was added under the stirring conditions containing a rotational speed of 5,000 rpm, and stirred for 22 hours, 0.2 g of polyacrylamide potassium salt and 0.5 g of polyanionic cellulose were then added and stirred for 40 minutes, 3 g of sulfonated lignite resin was further added and stirred for 18 minutes, 2 g of the wall solidifier A4 was added and stirred for 25 minutes, 3 g of sulfonated asphalt and 3 g of methyl oleate were subsequently added and stirred for 22 minutes, 4 g of polymeric alcohol was then added and stirred for 24 minutes, such that the drilling fluid F4 was prepared.

Comparative Example 1

The wall solidifier was prepared according to the method of Example 1, except that the modified silica was not added, such that the wall solidifier DA1 was prepared.

Comparative Example 2

The wall solidifier was prepared according to the method of Example 1, except that the phenothiazine was not added during the process of preparing the modified silica, such that the wall solidifier DA2 was prepared.

Comparative Example 3

The drilling fluid was prepared according to the method of Example 5, except that 2 g of the wall solidifier A1 was replaced with 2 g of the wall solidifier DA1, such that the drilling liquid DF1 was prepared.

Comparative Example 4

The drilling fluid was prepared according to the method of Example 5, except that 2 g of the wall solidifier A1 was replaced with 2 g of the wall solidifier DA2, such that the drilling liquid DF2 was prepared.

Comparative Example 5

The drilling fluid was prepared according to the method of Example 5, except that the wall solidifier was added into the drilling fluid, i.e., the drilling fluid DF3 was prepared according to the following formulation: 4 g of bentonite, 0.2 g of polyacrylamide potassium salt, 0.5 g of polyanionic cellulose, 3 g of sulfonated lignite resin, 3 g of sulfonated asphalt, 3 g of methyl oleate and 4 g of polymeric alcohol.

Comparative Example 6

The drilling fluid was prepared according to the method of Example 5, except that 2 g of the wall solidifier A1 was replaced with 2 g of epoxy resin, i.e., the drilling fluid DF4 was prepared according to the following formulation: 4 g of bentonite, 0.2 g of polyacrylamide potassium salt, 0.5 g of polyanionic cellulose, 3 g of sulfonated lignite resin, 0.5 g of epoxy resin, 3 g of sulfonated asphalt, 3 g of methyl oleate and 4 g of polymeric alcohol.

Test Example 1

30 g of shale rock debris with 10 mesh was placed in a compression die press (with a diameter D=15 mm), 3 ml of distilled water was added and compressed at 2 MPa for 5 minutes, the rock core was taken; the different samples in Table 1 were used for preparing the different solutions having a concentration of 0.5 wt %, respectively, and the rock core was placed in the different solutions for 24 hours, the integrality of said rock cores was observed, the results were shown in Table 1 Integrality of rock cores after soaking in different solutions for 24 h.

TABLE 1

| Samples | Concentration, wt % | Status of rock cores |
|---|---|---|
| Polyvinyl acetate | 0.5 | Scattered |
| Ethyl cyanoacrylate | 0.5 | Scattered |
| Epoxy resin | 0.5 | Scattered |
| Wall solidifier A1 | 0.5 | Stable |
| Wall solidifier A2 | 0.5 | Stable |
| Wall solidifier A3 | 0.5 | Stable |
| Wall solidifier A4 | 0.5 | Stable |
| Wall solidifier DA1 | 0.5 | Substantially stable with slight scatter |
| Wall solidifier DA2 | 0.5 | Substantially stable with slight scatter |
| Dopamine hydrochloride | 0.5 | Scattered |
| Distilled water | / | Scattered |

As can be seen from the data of Table 1, the wall solidifiers provided by the present disclosure were capable of effectively cementing rock, thereby effectively cementing pores and cracks of formation and fulfilling the purpose of stabilizing the borehole wall of fractured formation.

Test Example 2

Rheological performance test: 400 mL of the aforementioned drilling fluids F1-F4 and DF1-DF4 were taken separately, and stirred with a rotational speed of 5,000 rpm for 20 min, loaded into an aging tank, and placed in a roller furnace, and rolled at a constant temperature of 140° C. for 16 h, the drilling fluids were taken out and cooled to room temperature, then stirred with a rotational speed of 5,000 rpm for 20 min, the apparent viscosity (AV, mPa·s), plastic viscosity (PV, mPa·s), dynamic shear (YP, Pa), static shear force at 10 s and 10 min, medium pressure API filtrate loss (FL, mL), high temperature and high pressure (HTHP) filtrate loss ($FL_{HTHP}$, mL, 140° C.) and sand bed invasion depth (100 mesh) of said drilling fluids were subsequently measured respectively according to the National Standard GB/T16783.1-2006 of China, the results were shown in Table 2 drilling fluid properties.

TABLE 2

| Drilling fluids | AV, mPa·s | PV, mPa·s | YP, Pa | 10 s/ 10 min | API, mL | $FL_{HTHP}$, mL | Sand bed invasion depth, cm |
|---|---|---|---|---|---|---|---|
| F1 | 41 | 28 | 13 | 2.5/3.5 | 2.0 | 10.6 | 0.6 |
| F2 | 38 | 26 | 12 | 2.5/3 | 2.8 | 11.4 | 0.8 |
| F3 | 38 | 25 | 13 | 2/3 | 3.4 | 12.0 | 1.0 |
| F4 | 40 | 28 | 12 | 2.5/3 | 2.4 | 11.0 | 0.7 |
| DF1 | 38 | 25 | 13 | 2/3 | 4.4 | 14.2 | 2.8 |
| DF2 | 39 | 27 | 12 | 2.5/3 | 3.8 | 13.0 | 2.0 |
| DF3 | 36 | 25 | 11 | 1.5/3 | 5.2 | 16.8 | 3.8 |
| DF4 | 37 | 26 | 11 | 1.5/3 | 5.2 | 16.4 | 3.6 |

As illustrated by the data in Table 2, the drilling fluids prepared with the method of the present disclosure had a sand bed invasion depth less than or equal to 1.0 cm, an API filtrate loss less than or equal to 3.4 mL, and a HTHP filtrate loss less than or equal to 12.0 mL. As can be seen, the drilling fluids prepared in the present disclosure can effectively reduce the API filtrate loss and the HTHP filtrate loss of the water-based drilling fluid, improve plugging property for the pores and cracks of the formation, thereby fulfilling the purpose of stabilizing the borehole wall of the fractured formation.

Test Example 3

The shale was pulverized and screened out the 6-10 mesh shale particles, which were subjected to drying in a 202-OA type electric thermostatic drying oven at 80° C. for 6 h and cooled for 2 h in the dryer, and subjected to rolling recovery experiments (hot rolling at 140° C. for 16 h) in 400 mL of said drilling fluids F1-F4 and DF1-DF4 and distilled water, respectively. The experimental results were shown in Table 3 performance of inhibiting shale dispersion of the drilling fluids.

TABLE 3

| Drilling fluids | Shale recovery rate, % |
|---|---|
| F1 | 99.6 |
| F2 | 99.4 |
| F3 | 98.6 |
| F4 | 99.5 |
| DF1 | 92.4 |
| DF2 | 93.6 |
| DF3 | 87.7 |
| DF4 | 86.5 |
| Distilled water | 76.4 |

As illustrated by the data in Table 3, the drilling fluids prepared with the method of the present disclosure had a shale recovery rate larger than or equal to 98.6%. As can be seen, the water-based drilling fluids prepared in the present disclosure were capable of significantly increasing the shale recovery rate, and suppressing the hydration and dispersion of the borehole wall shale of the fractured formation.

Test Example 4

6 shale rock cores (25 cm×50 cm) were soaked in the drilling fluids F1-F4 and DF1-DF4 and distilled water for 24 h respectively, and then subjected to the shale compressive strength test experiments, a rock core was used for testing the primitive shale compressive strength, the results were shown in Table 4 shale compressive Strength.

TABLE 4

| Drilling fluids | Compressive strength, MPa |
|---|---|
| F1 | 64.33 |
| F2 | 63.45 |
| F3 | 63.27 |
| F4 | 64.25 |
| DF1 | 48.26 |
| DF2 | 56.95 |
| DF3 | 24.46 |
| DF4 | 23.64 |
| Distilled water | 18.42 |
| Primitive shale | 65.23 |

As illustrated by the data in Table 4, the compressive strength of said drilling fluids prepared with the method of the present disclosure was comparable to that of the primitive shale, as can be seen, the water-based drilling fluid provided by the present disclosure can effectively maintain the compressive strength of shale, so as to prevent borehole wall collapse and sticking of drilling tool, thereby strengthening the borehole wall of fractured formation and reducing downhole troublesome conditions.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method for preparing a cementitious plugging wall solidifier for water-based drilling fluid comprising:
   (1) preparation of modified silica: dispersing nano-silica in an anhydrous ethanol to obtain a dispersion system A, dispersing γ-(methacryloxy)propyltrimethoxysilane in water/anhydrous ethanol system to obtain a dispersion system B, blending the dispersion system A and the dispersion system B and adjusting the pH to a range of 8-9, then adding phenothiazine to carry out a reaction, filtering a product after completion of the reaction, and washing and drying the product to obtain a modified silica; wherein the weight ratio of the nano silica, the γ-(methacryloyloxy)propyltrimethoxysilane and the phenothiazine in step (1) is (70-80):(7-8):1;
   (2) mixing the modified silica produced in step (1), acrylamide, acrylic acid, sodium p-styrene sulfonate, dimethyldiallylammonium chloride, 1-ethyl-(3-dimethylaminopropyl)carbodiimide, dopamine hydrochloride and water, introducing a protective gas under the stirring and heating conditions to remove oxygen, adding an initiator to carry out a reaction; wherein the weight ratio of the modified silica, the acrylamide, the acrylic acid, the sodium p-styrene sulfonate, the dimethyldiallyl ammonium chloride, the 1-ethyl-(3-dimethylaminopropyl)carbodiimide, the dopamine hydrochloride and the initiator is (2-5):(10-20):(2-5):(1-2):(2-5):(0.2-0.5):(2-5):(0.2-0.5);
   (3) after the reaction is finished, subjecting a product obtained in step (2) to washing, drying and pulverizing to prepare a cementitious plugging wall solidifier.

2. The method of claim 1, wherein the water/anhydrous ethanol dispersion system in step (1) is prepared by mixing water and anhydrous ethanol according to a volume fraction of 1:(8.5-9.5).

3. The method of claim 1, wherein triethylamine is used for adjusting the pH in step (1).

4. The method of claim 1, wherein the reaction conditions in step (1) comprise: a temperature within a range of 55-65° C., and a time of 3-5 hours.

5. The method of claim 1, wherein the initiator in step (2) is at least one selected from the group consisting of azobisisobutyramidine hydrochloride, potassium persulfate and ammonium persulfate.

6. The method of claim 1, wherein the conditions of removing oxygen in step (2) comprise: a temperature of 60-70° C. and a time of 25-40 min.

7. The method of claim 1, wherein the reaction conditions in step (2) comprise: a temperature of 60-70° C. and a time of 4-5 hours.

8. A cementitious plugging wall solidifier prepared with the method of claim 1.

9. A water-based drilling fluid, wherein the water-based drilling fluid comprises bentonite, polyacrylamide potassium salt, polyanionic cellulose, sulfonated lignite resin, the cementitious plugging wall solidifier of claim 8, sulfonated asphalt, methyl oleate and polymeric alcohol.

10. The water-based drilling fluid of claim 9, wherein the weight ratio of the bentonite, the polyacrylamide potassium salt, the polyanionic cellulose, the sulfonated lignite resin, the cementitious plugging wall solidifier, the sulfonated asphalt, the methyl oleate and the polymeric alcohol is 4:(0.1-0.2):(0.3-0.5):(2-3):(0.5-2):(2-3):(2-3):(2-4).

\* \* \* \* \*